(12) United States Patent
Rajaraman et al.

(10) Patent No.: US 12,206,570 B1
(45) Date of Patent: Jan. 21, 2025

(54) SYSTEM AND METHOD OF PSEUDO PATH COMPRESSION-BASED ENHANCEMENT OF DECENTRALIZED DATA SYSTEMS

(71) Applicant: Bank of America Corporation, Charlotte, NC (US)

(72) Inventors: Manikandan Rajaraman, Chennai (IN); Sakshi Bakshi, New Delhi (IN); Saravanan Balasubramanian, Chennai (IN); Jayakumar Manokaran, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/385,421

(22) Filed: Oct. 31, 2023

(51) Int. Cl.
*H04L 45/02* (2022.01)
*H04L 45/00* (2022.01)
*H04L 45/122* (2022.01)

(52) U.S. Cl.
CPC ............ *H04L 45/02* (2013.01); *H04L 45/122* (2013.01); *H04L 45/20* (2013.01)

(58) Field of Classification Search
CPC ......... H04L 45/02; H04L 45/18; H04L 45/16; H04L 45/20
See application file for complete search history.

(56) References Cited

U.S. PATENT DOCUMENTS

| 2007/0081726 | A1 | 4/2007 | Westerman et al. | |
|---|---|---|---|---|
| 2008/0125069 | A1* | 5/2008 | Davis | H04L 45/26 455/500 |
| 2020/0084136 | A1* | 3/2020 | Ross | H04L 45/16 |
| 2023/0171182 | A1* | 6/2023 | Goel | H04L 67/02 370/389 |

FOREIGN PATENT DOCUMENTS

| CN | 101605094 | 2/2012 |
|---|---|---|
| CN | 101883101 | 11/2012 |
| CN | 102378409 | 3/2013 |
| CN | 104395953 | 7/2017 |
| CN | 104050015 | 1/2018 |
| CN | 110097611 | 8/2019 |
| CN | 106202303 | 9/2019 |
| CN | 112235401 | 9/2021 |
| JP | 6094487 | 2/2017 |

OTHER PUBLICATIONS

"Secure Hash Standard," Information Technology Laboratory National Institute of Standards and Technology, http://dx.doi.org/10.6028/NIST.FIPS.180-4, Aug. 2015.

* cited by examiner

*Primary Examiner* — Chirag R Patel
(74) *Attorney, Agent, or Firm* — Weiss & Arons LLP

(57) ABSTRACT

Provided herein is a method of improving throughput of a DHT network, which may include the steps of inputting a maximal allowable number of node hops, receiving a data retrieval query, and locating an authority node via a gossip protocol. If the observed node hop number exceeds the maximal allowable number, the network may perform a shortening protocol, which may include the steps of creating a supplementary read table for the receiving node, adding the entry's hash to the supplementary read table, creating a supplementary write table for the authority node, and adding the entry's hash to the supplementary write table. The gossip protocol may interrogate in parallel the routing table and the supplementary read table, when extant, of each node participating in the gossip protocol.

20 Claims, 9 Drawing Sheets

Node 20

| Distributed Hash Table | | | Routing Table | | |
|---|---|---|---|---|---|
| Hash | DHT Add. | Data | DHT Add. | Node Detail | Node Distance |
| 2228 | 20 | ACC_NUM_57 | 21 | Node 21-IP | 1 |
| 7476 | 20 | ACC_NUM_168 | 22 | Node 22-IP | 2 |
| 8532 | 20 | ACC_NUM_260 | 24 | Node 24-IP | 4 |
| 5333 | 21 | ACC_NUM_1 | 28 | Node 28-IP | 8 |
| 3413 | 21 | ACC_NUM_60 | 4 | Node 4-IP | 16 |
| 9589 | 21 | ACC_NUM_185 | | | |

630

Node 28

| Routing Table | | |
|---|---|---|
| DHT Add. | Node Detail | Node Distance |
| 29 | Node 29-IP | 1 |
| 30 | Node 30-IP | 2 |
| 0 | Node 0-IP | 4 |
| 4 | Node 4-IP | 8 |
| 12 | Node 12-IP | 16 |

632

638

Node 2

| Distributed Hash Table | | | Routing Table | | |
|---|---|---|---|---|---|
| Hash | DHT Add. | Data | DHT Add. | Node Detail | Node Distance |
| 9058 | 2 | ACC_NUM_47 | 3 | Node 3-IP | 1 |
| 9666 | 2 | ACC_NUM_88 | 4 | Node 4-IP | 2 |
| 1026 | 2 | ACC_NUM_122 | 6 | Node 6-IP | 4 |
| 2211 | 3 | ACC_NUM_18 | 10 | Node 10-IP | 8 |
| 5251 | 3 | ACC_NUM_43 | 18 | Node 18-IP | 16 |
| 9923 | 3 | ACC_NUM_52 | | | |

634

Node 0

| Routing Table | | |
|---|---|---|
| DHT Add. | Node Detail | Node Distance |
| 1 | Node 1-IP | 1 |
| 2 | Node 2-IP | 2 |
| 4 | Node 4-IP | 4 |
| 8 | Node 8-IP | 8 |
| 16 | Node 16-IP | 16 |

Node 20

| Distributed Hash Table | | | Routing Table | | | Path Compression Read Table | | | |
|---|---|---|---|---|---|---|---|---|---|
| Hash | DHT Add. | Data | DHT Add. | Node Detail | Node Distance | Hash | DHT Add. | Data | Read Node DHT Address | Read Node Detail |
| 2228 | 20 | ACC_NUM_57 | 21 | Node 21-IP | 1 | 2211 | 3 | ACC_NUM_18 | 2 | Node 2-IP |
| 7476 | 20 | ACC_NUM_168 | 22 | Node 22-IP | 2 | | | | | |
| 8532 | 20 | ACC_NUM_260 | 24 | Node 24-IP | 4 | | | | | |
| 5333 | 21 | ACC_NUM_1 | 28 | Node 28-IP | 8 | | | | | |
| 3413 | 21 | ACC_NUM_60 | 4 | Node 4-IP | 16 | | | | | |
| 9589 | 21 | ACC_NUM_185 | | | | | | | | |

650 ⟍  652 ⟍  654 ⟍

Node 20

| Path Compression Write Table | | | |
|---|---|---|---|
| Hash | DHT Add. | Data | Write Node DHT Address | Write Node Detail |

Node 2

Distributed Hash Table

| Hash | DHT Add. | Data |
|---|---|---|
| 9058 | 2 | ACC_NUM_47 |
| 9666 | 2 | ACC_NUM_88 |
| 1026 | 2 | ACC_NUM_122 |
| 2211 | 3 | ACC_NUM_18 |
| 5251 | 3 | ACC_NUM_43 |
| 9923 | 3 | ACC_NUM_52 |

660

Routing Table

| DHT Add. | Node Detail | Node Distance |
|---|---|---|
| 3 | Node 3-IP | 1 |
| 4 | Node 4-IP | 2 |
| 6 | Node 6-IP | 4 |
| 10 | Node 10-IP | 8 |
| 18 | Node 18-IP | 16 |

662

Path Compression Read Table

| Hash | DHT Add. | Data |
|---|---|---|

664

Node 2

Path Compression Write Table

| Hash | DHT Add. | Data | Write Node DHT Address | Write Node Detail |
|---|---|---|---|---|
| 2211 | 3 | ACC_NUM_18 | 20 | Node 20-IP |

SYSTEM AND METHOD OF PSEUDO PATH COMPRESSION-BASED ENHANCEMENT OF DECENTRALIZED DATA SYSTEMS

FIELD OF TECHNOLOGY

Aspects of the disclosure relate to distributed hash tables.

BACKGROUND OF THE DISCLOSURE

With the rise in computing application data volumes and non-uniform structure and formats, it is advantageous for data storage solutions to maximize throughput and minimize latency.

It would be advantageous to have systems and methods for customizing and executing architecture frameworks based on nature of data of the applications, in order to maximize throughput and minimize latency.

It would be further desirable to have a method of determining an optimal and/or appropriate storage architecture of DHT-based storage solutions.

It would be yet further desirable to have a method of reducing the carbon footprint of a DHT-based storage architecture.

SUMMARY OF THE DISCLOSURE

Distributed hash table (DHT) technology is a storage solution that utilizes a peer-to-peer network of computers (also referred to herein as nodes), which share the burden of storing and managing access to large databases. Typically, a DHT includes a collection of values, where each value is paired to a key. A predetermined algorithm may be executed on the key. The result of the predetermined algorithm may be a hash. As such, the hash is typically an integer derived from the key. The process of deriving the hash from the key may be referred to as "hashing". A DHT may be understood to refer to a hash table split over multiple computers.

The term "partition" or "shard" may refer to a chunk of data stored in a particular machine or server in a distributed database. The partitioned data chunks may be referred to as logical shards. The machine that stores the logical shard may be referred to as a physical shard, a database node or a node. A physical shard may include multiple logical shards. Each node may be responsible for storing a range of keys and their associated values.

DHTs may utilize a gossip protocol for peer-to-peer computer communications. In a gossip protocol, a given node in a network may have a list of nodes with which the given node directly communicates. This list may be referred to as a routing table. Each node in the network may have access to a database of all the nodes. Each node in the network may also have access to a list of the hashes or range of hashes for which each node is an authority. Each node in the network may be capable of accessing a database that includes the routing tables of each other node in the database.

In some cases, the nodes in the database may be assigned consecutive identifying numbers, where node n−1 may be the immediate predecessor of node n, node n−2 may be the next closest predecessor of node n, n+1 may be the immediate successor of node n, and node n+2 may be the next closest successor of node n. The nodes may occupy a circular identifier space. The nodes may be arranged in a DHT ring. The node with the highest identifying number may be considered the immediate predecessor of node 1. Among the nodes listed in a given node's routing table, the given node may be capable of computing which of the listed nodes is the closest predecessor (nearest relative to the other listed nodes) to a given authority node. The closest predecessor of an authority node may be defined as the predecessor with the smallest linear distance when counting forward from the predecessor to the authority node. There may be "holes" in the sequence, such that the immediate successor of node 152 may be node 164 (and nodes from 153 to 163 do not exist); in this case, the immediate predecessor of node 164 will be node 152.

Typically, information in a gossip protocol is passed from an initial node to each node in the initial node's routing table. Subsequently, the information may be passed to a subsequent layer of nodes, which are listed in the routing tables of the second layer nodes. In some cases, each node may be the authority for a specified range of keys. As such, a given node may also have a default list of nodes to which the given node copies information from the specified range of keys.

When a node in a network receives a request for data that is stored on a different node, the first node may query the list of nodes on the first node's routing table. If none of the nodes listed on the table are an authority for the requested data, the first node may determine which of the nodes in the table is the closest predecessor (among the listed nodes) to an authority node. The closest predecessor node in the table may query the nodes in the closest predecessor node's table. If an authority node is also not found in this table, the closest node in this table may be queried. The process may be repeated until an authority node is identified.

While DHT-based storage implementations can provide relatively high throughput, they may suffer from excessive node hops, at least in part because of their peer-to-peer nature. Therefore, they cannot guarantee low latency.

A method in accordance with the principles of the described embodiments may be implemented by a computer and/or be automated.

A method in accordance with the principles of the described embodiments may utilize a computer processor and one or more non-transitory computer-readable media storing computer executable instructions. The instructions, when executed by the computer processor, may automatically store data in a DHT and perform various other activities, as described herein.

Provided herein is a computer network, in accordance with the principles of the described embodiments.

The network may include a storage layer. The network may include a compression layer. The network may include an evaluator layer.

The storage layer may reside among the memory of the nodes in a distributed fashion. The storage layer may include a distributed hash table (DHT). The DHT may include a plurality of nodes. Each node may include a routing table. Each node may have a routing table. Each node may be associated with a routing table. Reference herein to a routing table of a first node is intended to encompass a list of nodes that are queried by the first node, upon receipt by the first node of a request to retrieve a data entry (which may be referred to herein simply as an "entry"). In some embodiments, when the first node is not an authority for the requested data entry, the first node may query all the nodes on the first node's routing table.

Those skilled in the art will appreciate that a distributed hash table (DHT) may contain a collection of pairs of data, each pair having a key and a value. A hash may be an integer derived from the key. The derivation may utilize a predetermined algorithm. The process of deriving the hash from the key may be referred to as "hashing".

The described DHT may store a dataset.

The described compression layer may reside in an overlay network layer. The compression layer may reside in a processor within the overlay network layer. The compression layer may reside in a layer separate from both the storage layer and the overlay network. The compression layer may reside in a processor within the separate layer. The compression layer may collect network information from any or all of layers 2-4 of an Open Systems Interconnection (OSI) model, namely the data link, network, and transport layers. The information may include path lengths of one or more data retrieval queries. The compression layer may include a processor. The processor may analyze the described network information. The compression layer may be configured to input a maximal allowable number of node hops.

The described compression layer may be configured to determine and (at least in some cases) modify one or more effective data retrieval path lengths, in response to the network receiving a data retrieval query. The query, which may be referred to as "first data retrieval query", may be a request to locate an entry, and may be received by a receiving node. The entry and receiving node may be referred to as a "first entry" and "first receiving node", respectively. The entry may be provided by a node that is an authority for the entry, which may be referred to herein as either a providing node or an authority node.

The protocol for modifying effective data retrieval path lengths may include determining how many node hops occurred during the process of retrieving the entry. The number of node hops may be referred to herein as the "observed node hop number".

The protocol for modifying effective data retrieval path lengths may include comparing the observed node hop number to the maximal allowable number.

For cases wherein the observed node hop number exceeds the maximal allowable number, the protocol for modifying effective data retrieval path lengths may include performing a path shortening protocol for that entry. In some embodiments, the terms "path shortening" and "pseudo path compression" may be used interchangeably herein.

For cases wherein the observed node hop number does not exceed the maximal allowable number, the protocol for modifying effective data retrieval path lengths may include no further steps for that entry.

Use herein of the modifier "second", for example referring to a second receiving node, query, entry, or any other components or steps, encompasses the possibility of multiple subsequent data retrieval queries (following the first query). Although there may be more than one subsequent node, query, entry, etc., each subsequent node, query, entry, etc., may still be referred to as a "second" node, query, entry, etc., for compactness of language. The disclosure encompasses situations wherein the node, query, entry, etc., do/does not differ from the described first second node, query, entry, etc., respectively.

Reference herein to a node "interrogating" a table may refer to the node consulting the table when seeking an authority node for an entry. Reference herein to a node interrogating multiple tables in parallel may refer to the node consulting the tables substantially simultaneously when seeking an authority node for an entry. In some embodiments, a node that receives a query may interrogate the receiving node's routing table, which may be similar to a standard routing table of a DHT, and, at the same time, the receiving node's supplementary read table that was created by a described path shortening protocol. Interrogation of tables in parallel can be distinguished from interrogation in sequence, whereby one table is consulted first, and a second table is consulted subsequently, for example after completion of interrogating the first table.

The compression layer may be configured to perform the described protocol for modifying effective data retrieval path lengths on the subsequent data retrieval queries.

The described evaluator layer may reside in a layer separate from both the storage layer and the overlay network. The evaluator layer may reside in a processor within the separate layer. The evaluator layer may simulate network information from any or all of layers 2-4 of an Open Systems Interconnection (OSI) model, namely the data link, network, and transport layers. The information may include path lengths of one or more simulated data retrieval queries. The evaluator layer may include a processor. The processor may analyze the described simulated network information. The evaluator layer may be configured to simulate ingestion of the dataset by the DHT. The evaluator layer may be configured to estimate the frequency of performing the shortening protocol.

A node that is an authority for an entry may be referred to herein as an "authority node" of that entry.

Reference herein to a supplementary read table of a subject node may indicate that the subject node can directly read, or obtain, the information listed in the table from the source(s) listed in the table. Each row in a supplementary read table may refer to a data entry. In some embodiments, a supplementary read table differs from a routing table in that a supplementary read table routes queries regarding one or more particular data entries. By contrast, a routing table may route queries regarding all data entries. Put otherwise, the subject node may query all nodes in the subject node's routing table, regardless of which data entry is the subject of the query. In contrast, a node listed in the supplementary read table of the node may be queried only regarding a specific data entry mentioned in the supplementary read table in conjunction with the listed node. In some embodiments, the described supplementary read table of a subject node may list only nodes not listed in the subject node's routing table.

In some embodiments, each file in the described network has a replication set. The term "replication set" of a data entry or file may refer to a set of nodes that each includes a copy of the data entry or file. In some embodiments, a data entry or file may have a default replication set and a supplementary replication set. The default replication set may be solely determined by the routing table of the primary authority node of the data entry or file. The supplementary replication set may be determined by one or more path shortening protocols performed on that data entry or file. The default replication set may include the same set of nodes for each data entry or file having a particular primary authority node. The supplementary replication set may be specific to each data entry or file.

Reference herein to a supplementary write table of a subject node may indicate that the subject node can directly copy the information listed in the table to the destination node(s) listed in the table. Each row in a supplementary write table may refer to a data entry. In some embodiments, a supplementary write table differs from a DHT address table or replication table in that a supplementary write table directs copying of one or more particular data entries from an initial host (typically the node that is the DHT address of the entry) to an additional host(s)/node(s). By contrast, the terms DHT address table and replication table may be used herein to refer to a table that directs copying of all data entries for which the initial host is the DHT address. Put otherwise, the initial host may copy all entries for which the initial host is the DHT address to the additional host(s) listed in the initial node's DHT address table or replication table. In contrast, a destination node listed in the supplementary write table of the initial host node may receive only copies of specific data entry/entries mentioned in the supplementary write table in conjunction with the particular destination node. In some embodiments, the described supplementary write table of a subject node may list only nodes not listed in the subject node's DHT address table.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIGS. 6A-B depict DHT and routing table snapshots.

FIG. 7A, bottom panel, is a plot of a possible relationship between the storage volume and time.

DETAILED DESCRIPTION OF THE DISCLOSURE

Figure 1:
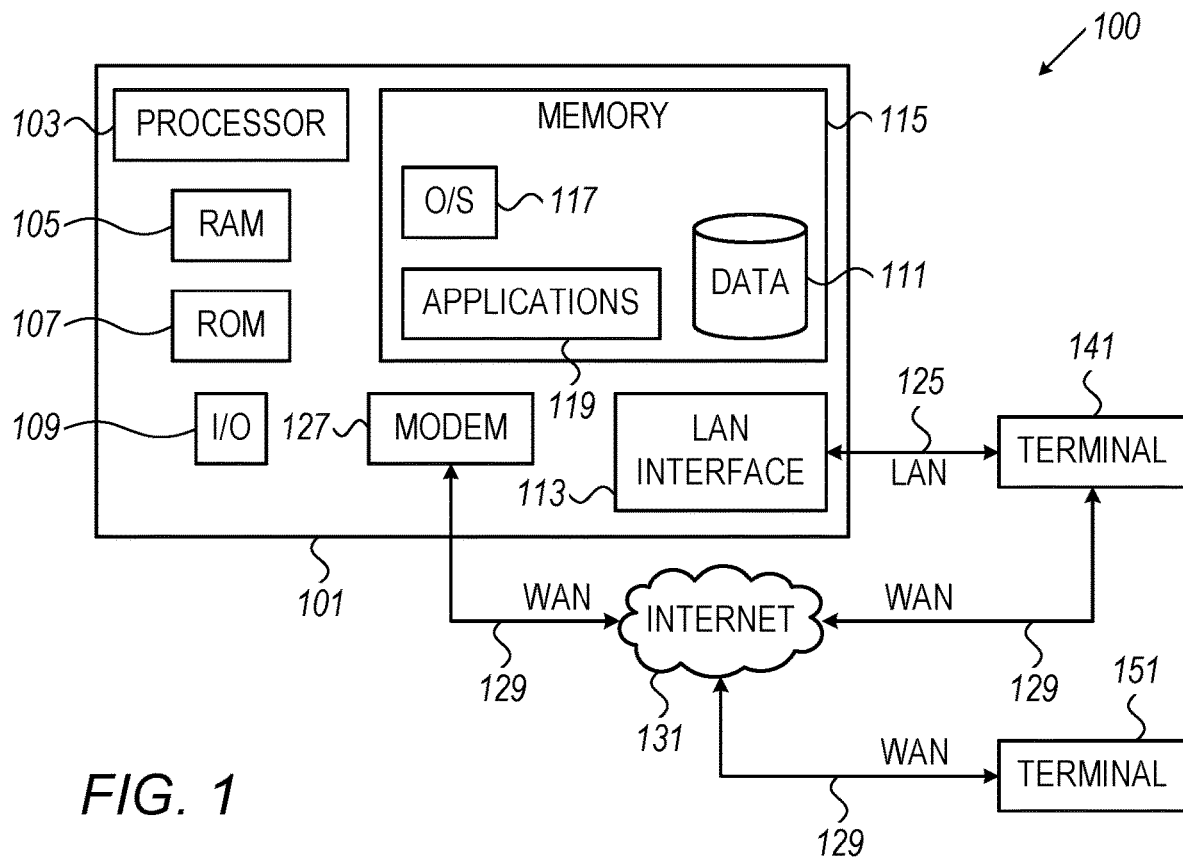
FIG. 1 shows an illustrative system in accordance with the principles of the described embodiments.

A method in accordance with the principles of the described embodiments may facilitate efficient use of distributed hash tables (DHTs).

Embodiments of the system, as described herein, leverage artificial intelligence, machine learning algorithms, and/or other complex, specific-use computer systems to provide a novel approach for DHTs storage and data retrieval.

Provided herein is a computer network, in accordance with the principles of the described embodiments.

The network may include a storage layer. The network may include a compression layer. The network may include an evaluator layer.

The storage layer may include a distributed hash table (DHT). The DHT may include a plurality of nodes. Each node may include a routing table. Each node may have a routing table. Each node may be associated with a routing table. It will be appreciated that the nodes of the DHT may also be the nodes of the computer network. Reference herein to a routing table of a first node is intended to encompass a list of nodes that are queried by the first node, in response to receipt by the first node of a request to retrieve a data entry (which may be referred to herein simply as an "entry"). In some embodiments, when the first node is not an authority for the requested data entry, the first node may query all the nodes on the first node's routing table.

The described DHT may store a dataset.

The described compression layer may be configured to input a maximal allowable number of node hops.

The described compression layer may be configured to test one or more data retrieval path lengths for conformity with a maximal allowable number, in response to the network receiving a data retrieval query. The query may be the first query received by the network. The query, which may be referred to as "first data retrieval query", may be a request to locate an entry, and may be received by a receiving node. The entry and receiving node may be referred to as a "first entry" and "first receiving node", respectively. The entry may be provided by a node that is an authority for the entry, which node may be referred to herein as either a "first providing node" or a "first authority node".

The protocol for testing conformity of a data retrieval path length may include determining how many node hops occurred during the process of retrieving the entry. The protocol may be operable to determine how many node hops occurred. The number of node hops may be referred to herein as the "observed node hop number".

The protocol for testing conformity of a data retrieval path length may include comparing the observed node hop number to the maximal allowable number. The protocol may be operable to compare the observed node hop number to the maximal allowable number.

For cases wherein the observed node hop number exceeds the maximal allowable number, the compression layer may be configured to perform a path shortening protocol for that entry.

For cases wherein the observed node hop number does not exceed the maximal allowable number, the compression layer may be configured to perform no further steps for that entry.

The path shortening protocol of the described methods and systems may include creating a supplementary read table of the first receiving node. The protocol may be operable to create a supplementary read table of the first receiving node. The supplementary read table may include the first entry's hash.

The path shortening protocol may include creating a supplementary write table of the first authority node. The protocol may be operable to create a supplementary write table of the authority node. The supplementary write table may include the first entry's hash.

In response to a subsequent data retrieval query being received by a node in the network, the node, which may be referred to as a "second receiving node", may be configured to interrogate in parallel both (i) the second receiving node's routing table and (ii) the second receiving node's supplementary read table. When the second receiving node does not have a supplementary read table, the second receiving node may be configured to interrogate only the second receiving node's routing table. The subsequent query, which may be referred to as "second data retrieval query", may be a request to locate a new entry, and may be received by another receiving node. The entry and receiving node may be referred to as a "second entry" and "second receiving node", respectively. The term "second", in each of these contexts, is intended to include the possibility of performing the described method on multiple subsequent data retrieval queries. Each subsequent data retrieval query may be referred to as a "second" data retrieval query, for convenience.

For cases wherein the observed node hop number of a subsequent data retrieval query exceeds the maximal allowable number, the protocol for modifying effective data retrieval path lengths may include performing a path shortening protocol for that entry. The modifying protocol may be operable to perform a path shortening protocol for that entry. The protocol may be as described hereinabove for the first data retrieval query.

Each node in the DHT may have a routing table. The routing table may be a list of nodes that are queried by the subject node. In some embodiments, a routing table is a list of node queried when the subject node receives a request to retrieve a data entry. In some embodiments, when the subject node is not an authority for the requested data entry, the subject node may query or "interrogate" all the nodes on the subject node's routing table. If none of the nodes in the routing table are authorities for the entry, the nodes in the routing table may in turn query the nodes in each of their routing tables. The process may be repeated until an authority node is located. The number of node hops can be derived from number of intermediate nodes by simply adding 1 to the number of intermediate nodes. It will be appreciated that, when a node in the routing table of the receiving node is an authority for the entry, then no additional routing tables need be consulted.

In response to receipt of one or more subsequent data retrieval queries, the described compression layer may be configured to test the data retrieval path length for conformity with the maximal allowable number, and where appropriate, perform the described shortening protocol.

The evaluator layer may be configured to simulate ingestion of the dataset by the DHT. The evaluator layer may be configured to estimate the frequency of performing the shortening protocol.

In some embodiments, the described evaluator layer may be configured to estimate an initial average number of node hops. The number may be averaged over a plurality of data retrieval queries. The data retrieval queries may be queries for entries in the dataset. This average may be calculated based on simulating a situation in which the shortening protocol has not been performed for any entries in the dataset. The plurality of data retrieval queries may be between 100-1000. The plurality may be between 1000-10,000. The plurality may be between 1000-50,000. The plurality may be between 1000-100,000. The plurality may be between 1000-500,000. The plurality may be between 10,000-100,000. The plurality may be between 10,000-500,000. This estimation may be performed to obtain an initial average, even though the system may in actuality intend to commence performing the shortening protocol immediately upon receipt of data retrieval queries.

In some embodiments, the described evaluator layer may be configured to calculate an estimated time course for the frequency of performing the shortening protocol. In some embodiments, the evaluator layer may be configured to determine an estimated time course for the average number of node hops. In some embodiments, the evaluator layer may be configured to estimate an estimated time course for the frequency of performing the shortening protocol and an average number of node hops. The time course may be calculated based on simulating a situation in which the shortening protocol is performed in each case in which the observed node hop number exceeds the described maximal allowable number. The time course may be predicated on an estimated frequency on receiving data retrieval queries.

In some embodiments, the evaluator layer may be further configured to estimate a time required to reach an equilibrium state. The estimated time to reach equilibrium may be predicated on an estimated frequency on receiving data retrieval queries. An equilibrium state may be defined as a state in which the average number of node hops substantially equals the maximal allowable number of hops. The term "substantially equals", in this context, may refer to a difference of less than a 0.01 between the average number of hops and the maximal allowable number of hops. In some embodiments, an equilibrium state may be defined as a state in which the average number of node hops does not appreciably change as additional data retrieval queries are received. A lack of appreciable change may refer to a change of less than 1% upon processing 10 retrieval queries. A lack of appreciable change may refer to a change of less than 1% upon processing 100 retrieval queries. A lack of appreciable change may refer to a change of less than 0.1% upon processing 10 retrieval queries. A lack of appreciable change may refer to a change of less than 0.1% upon processing 100 retrieval queries. In some embodiments, one or more of these steps may be performed by the evaluator layer. In some embodiments, all of these steps may be performed by the evaluator layer.

In some embodiments, the described supplementary write table may be configured to propagate updates to the first entry. Those skilled in the art will appreciate that a given node may have a DHT address table or replication table that directs baseline replication of all entries for which the given node is the DHT address. The DHT address table may also direct propagation of updates to entries for which the given node is the DHT address. In some embodiments, the described supplementary write table may direct additional propagation of updates to a data entry for which a given node is the DHT address. The updates may be in addition to nodes listed on the given node's DHT address table or replication table.

Also provided herein is a method of improving throughput of a network, in accordance with the principles of the described embodiments. The network may include a DHT. The DHT may include a plurality of nodes. Each node may have a routing table. Each node may include a routing table. Each node may be associated with a routing table.

The method may include the step of receiving a data retrieval query. The method may be operable to receive a data retrieval query. The query may be the first query received by the network. This query may be referred to herein as the "first data retrieval query", and the entry that is the subject of the query (the entry that is being sought) may be referred to as the "first entry". The node receiving this request may be referred to as the "first receiving node".

The method may include the step of locating an authority node via a gossip protocol. The method may be operable to locate an authority node via a gossip protocol. This authority node and gossip protocol may be referred to herein as the "first authority node" and "first gossip protocol", respectively. The first gossip protocol may interrogate the routing table of the first receiving node. If the authority node is not found among the nodes listed on the routing table of the first receiving node, then the first receiving node may determine the closest node to the authority node on the first receiving node's routing table. The routing table of the closest node may then be queried. The same procedure may be followed if the authority node is still not located among this (second) routing table. Overall, the routing tables of the first receiving node and one or more intermediate nodes participating in the gossip protocol may be interrogated. In some embodiments, an authority node may sometimes not be successfully located, in which case the described method is not performed for that particular query.

Figure 5:
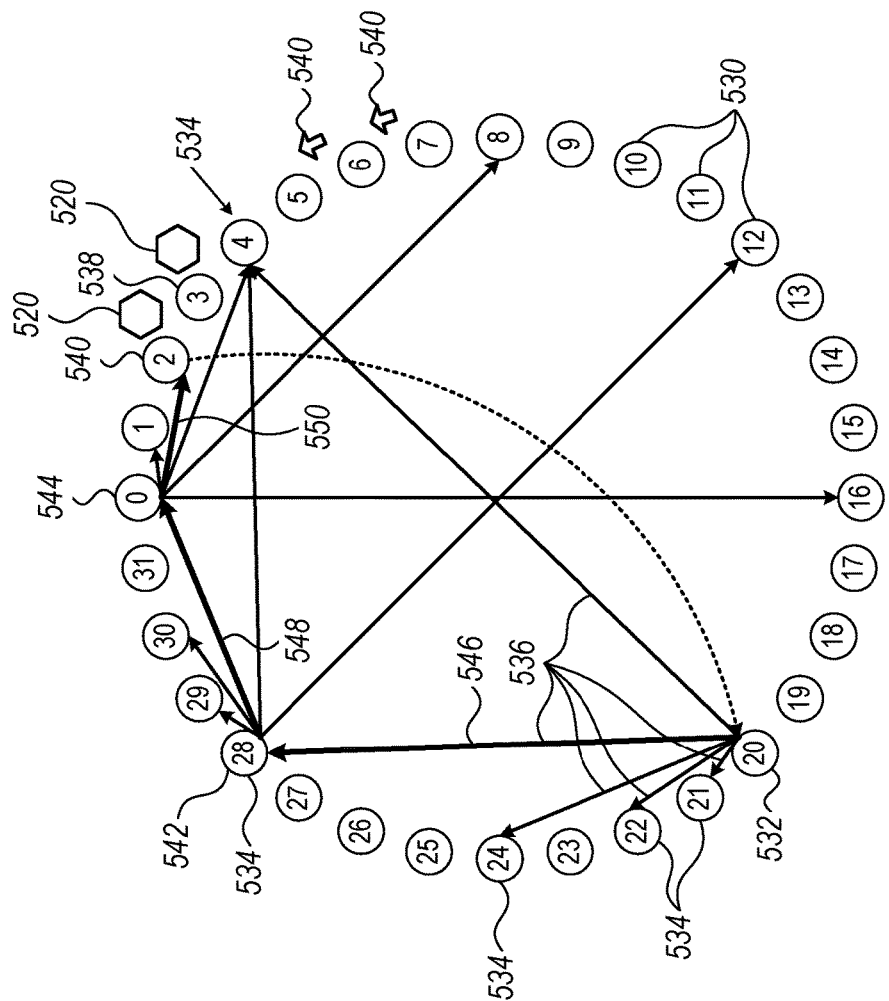
FIG. 5 depicts an exemplary call retrieval flow path.

Solely for exemplification, suppose that a query is received by node 20 (for example as depicted in FIG. 5). Nodes 2 and 3 are both authorities for the entry. Node 20 is not an authority for the subject entry, so node 20 determines whether any of the nodes on node 20's routing table, namely nodes 21, 22, 24, 28, and 4, are an authority. None of these nodes are an authority for the entry, so node 20 determines that node 28 is the closest neighbor to the authority nodes. Node 28 consults node 28's routing table and finds that the authority nodes are not listed. Node 28 determines that node 0 is the closest node. Node 0 consults node 0's routing table and finds node 2, an authority node. Node 2 returns the data to node 20. Three node hops, namely 20-28, 28-0, and 0-2, were required to find the authority node.

The term "gossip protocol" may refer to a method of passing communications among a network of nodes. The network may be a peer-to-peer network of computer nodes. A given node in the network may have a list of nodes with which the given node directly communicates, which list may be referred to as a routing table. Each node in the network may have access to a database of all the nodes and the hashes (or range of hashes) for which they are an authority. Each node in the network may have access to a method of computing the distances between any 2 pairs of nodes. Each node in the network may have access to a database of the routing tables of each node in the database.

In some embodiments, information in a gossip protocol is passed from an initial node to each node in the initial node's routing table. The latter nodes may be referred to as the second layer. Subsequently, the information may be passed to the next layer of nodes, which are listed in the routing tables of the second layer nodes. This next layer of nodes may be referred to as the third layer, and so on.

In some embodiments, a gossip protocol may also be used to transmit updates to an entry.

The described method may include the step of determining how many node hops were required to locate the first authority node. The method may be operable to determine how many node hops were required to locate the first authority node. This number of node hopes may be referred to herein as the "first observed node hop number".

The method may include the step of performing a shortening protocol after executing the first query. The method may be operable to perform a shortening protocol after executing the first query. This protocol may be referred to as the "first shortening protocol". The protocol may be performed when the first observed node hop number exceeds the maximal allowable number.

The first shortening protocol may include the step of creating a supplementary read table for the first receiving node. The protocol may be operable to create a supplementary read table for the first receiving node. This supplementary read table may be referred to herein as the "first supplementary read table". The first shortening protocol may include the step of adding the first entry's hash to the first supplementary read table.

The first shortening protocol may include the step of creating a supplementary write table for the first authority node. The protocol may be operable to create a supplementary write table for the first authority node. This supplementary write table may be referred to herein as the "first supplementary write table". The first shortening protocol may include the step of adding the first entry's hash to the first supplementary write table.

The method may include the step of processing additional retrieval queries in a similar fashion. The method may be operable to process additional retrieval queries in a similar fashion. Processing a query may involve the steps of receiving the query, locating an authority node, determining how many node hops were required, and, when warranted, performing a path shortening protocol. These steps are elucidated herein. Since the aforementioned steps may be performed each time a query is received, they may typically be performed iteratively. The difference between processing the first query and a subsequent query may be that the nodes do not yet have a supplementary read and/or write table at the time of processing the first query.

The first step in processing an additional retrieval query for an entry may be for a receiving node to receive the query. The receiving node, query, and entry may be referred to as the "second receiving node", "second data retrieval query", and "second entry". The second receiving node may also be referred to, throughout the description below of the second gossip protocol, as "the receiving node".

An additional step in processing an additional retrieval query for an entry may be locating an authority node via a gossip protocol. This authority node and gossip protocol may be referred to as the "second authority node" and "second gossip protocol" respectively. In some embodiments, the second gossip protocol may interrogate in parallel the routing table and the supplementary read table (when extant), of the second receiving node. In some embodiments, the second gossip protocol may interrogate in parallel the routing table and the supplementary read table (when extant), of each node participating in the second gossip protocol. Nodes participating in the second gossip protocol may include the second receiving node and any intermediate nodes (which may be referred to as a second set of intermediate nodes, meaning that they are intermediate nodes of the second gossip protocol). When an authority node is found among the nodes listed in a routing table or supplementary read table, the authority node may retrieve and return the entry to the receiving node.

The terms "immediate node" and "intermediate nodes", as used herein, may refer to any nodes directly participating in a gossip protocol chain that leads from the receiving node to the authority node that is located by the protocol.

In some embodiments, if an authority node is not found among the nodes listed on the routing table and the supplementary read table of the receiving node, then the receiving node may determine the node, among the nodes listed on the second node's routing table, that is closest to an authority node. This closest node may be referred to as the "second-layer closest node". This closest node may be referred to as an intermediate node of the second gossip protocol. The routing table and supplementary read table of the second-layer closest node may then be queried to search for an authority node. If the authority node is still not located among this (second level) routing table and supplementary read table, then the second receiving node may determine the closest node, among the nodes listed on the second node's routing table, to an authority node. This closest node may be referred to as the "third-layer closest node". This closest node may be considered an intermediate node in the second gossip protocol. The routing table and supplementary read table of the third-layer closest node may then be queried to search for an authority node. The aforementioned process may be repeated as many times as necessary until an authority node is listed on a queried routing table or supplementary read table. Overall, the routing tables and supplementary read tables of the second receiving node and one or more intermediate nodes participating in the gossip protocol may be interrogated. Whenever the authority node is located, then the authority node may retrieve and return the entry to the receiving node.

In some embodiments, if an authority node is not found among the nodes listed on the routing table and the supplementary read table of the receiving node, then each of the nodes listed on the routing table of the receiving node may interrogate its own (the listed node's) routing table and supplementary read table. The nodes listed on the routing table of the receiving node may be referred to as intermediate nodes of the second gossip protocol. When an authority node is among the nodes listed in a routing table or supplementary read table, the authority node may retrieve and return the entry to the receiving node. The aforementioned process may be repeated as many times as necessary until an authority node is listed on a queried routing table or supplementary read table. Overall, the routing tables and supplementary read tables of the second receiving node and one or more intermediate nodes participating in the gossip protocol may be interrogated. Whenever the authority node is located, then the authority node may retrieve and return the entry to the receiving node.

An additional step in processing an additional retrieval query may be determining how many node hops were required to locate the second authority node. This number may be hereinafter referred to as the "second observed node hop number".

An additional step in processing an additional retrieval query may be performed only when the second observed node hop number exceeds the maximal allowable number. This step may perform a shortening protocol. This shortening protocol may be referred to as the "second shortening protocol".

The second shortening protocol may include the step of determining whether the second receiving node has a supplementary read table. This protocol may be operable to determine whether the second receiving node has a supplementary read table. When the second receiving node does not have a supplementary read table, the protocol may include the step of creating a supplementary read table for the receiving node. This protocol may be operable to create a supplementary read table for the receiving node. The supplementary read table may be referred to as the "second supplementary read table". The second shortening protocol may include the step of adding the second entry's hash to the second supplementary read table, regardless of whether the supplementary table was recently created or pre-extant. The protocol may be operable to add the second entry's hash to the second supplementary read table.

The second shortening protocol may include the step of determining whether the second authority node has a supplementary write table. The protocol may be operable to determine whether the second authority node has a supplementary write table. When the second authority node does not have a supplementary write table, the protocol may include the step of creating a supplementary write table. The protocol may be operable to create a supplementary write table. The supplementary write table may be referred to as a "second supplementary write table". The second shortening protocol may include the step of adding the second entry's hash to the second supplementary write table, regardless of whether the supplementary table was recently created or pre-extant. The protocol may be operable to add the second entry's hash to the second supplementary write table.

In some embodiments, a described method may include the step of receiving an update to the second entry. The method may be operable to receive an update to the second entry. In some embodiments, the method may include the step of propagating the update via the described second supplementary write table. The method may be operable to propagate the update via the described second supplementary write table.

In some embodiments, a described method may include the step of inputting a maximal allowable amount of storage volume for a node in the network. The method may be operable to input a maximal allowable amount of storage volume for a node in the network. This node may be referred to herein as a receiving node, or the second receiving node. In some embodiments, a described method may include the step of monitoring the actual storage volume occupied by the DHT in a second receiving node. In some embodiments, a method may include the step of monitoring the actual storage volume used by the DHT in a second receiving node. The method may be operable to monitor the actual storage volume occupied or used by the DHT in a second receiving node.

In some embodiments, a described method may include the step of, when the actual storage volume exceeds the maximal storage volume, instructing the receiving node to disallow further additions to the second supplementary read table of that receiving node. The method may be operable to, when the actual storage volume exceeds the maximal storage volume, instruct the receiving node to disallow further additions to the second supplementary read table of that receiving node. In some embodiments, these steps may be performed for each node in the network. In some embodiments, the maximal storage volume may be the same for each node in the network. In some embodiments, each node in the network may have its own maximal storage volume. In some embodiments, the monitoring may be performed by the network. In some embodiments, the monitoring may be performed by the evaluator layer.

In some embodiments, the described network may have a Chord topology. In some embodiments, the network may utilize a Chord topology. Chord may refer to an algorithm for a peer-to-peer DHT. In a Chord algorithm, nodes and keys may be assigned an m-bit identifier using consistent hashing. In some embodiments, the term "node" may refer to both a node itself and its identifier (ID), without ambiguity. In some embodiments, nodes and keys may be arranged in an identifier circle that has at most $2^m$ nodes, ranging from 0 to $2^m-1$. In some embodiments, m may be sufficiently large to avoid a significant possibility of collision. In some embodiments, some of the values may map to machines or keys, and most values may be empty. In some embodiments, each node may have a successor and a predecessor. The successor to a node may be the next node in the identifier circle in a clockwise direction. The predecessor may be the next node in the counterclockwise direction. For purposes of illustration, if there were a node for each possible ID, the successor of node 0 may be node 1, and the predecessor of node 0 may be node $2^m-1$. In some embodiments, a described gossip protocol may utilize a Chord topology.

In some embodiments, the network may have a content-addressable network (CAN) topology. In some embodiments, the network may utilize a CAN topology. In some embodiments, the CAN includes an overlay network whose topology is a virtual multi-dimensional Cartesian coordinate space. In some embodiments, the topology may be a multi-torus topology. In some embodiments, the coordinate space may be an n-dimensional space includes a virtual logical address for each node that is independent of the physical location and physical connectivity of the nodes. In some embodiments, points within the space may be identified with coordinates. In some embodiments, the entire coordinate space may be dynamically partitioned among all the nodes in the system such that every node possesses at least one distinct zone within the overall space. In some embodiments, a CAN node may maintain a routing table that holds the IP address and virtual coordinate zone of each of its neighbors. A node may route a message towards a destination point in the coordinate space. The node may first determine which neighboring zone is closest to the destination point, and then look up that zone's node's IP address via the routing table. In some embodiments, a described gossip protocol may utilize a CAN topology.

In some embodiments, the network may have a Tapestry topology. In some embodiments, the network may utilize a Tapestry topology. In some embodiments, each node may be assigned a unique nodeID uniformly distributed in a large identifier space. In some embodiments, SHA-1 may be used to produce a 160-bit identifier space represented by a 40 digit hex key. In some embodiments, the term "SHA-1" may refer to Secure Hash Algorithm 1, in some embodiments as described in FIPS PUB 180-4. In some embodiments, application-specific endpoints GUIDs may be assigned unique identifiers. NodeIDs and GUIDs are roughly evenly distributed in the overlay network with each node storing several different IDs. In some embodiments, the term "Globally Unique Identifier" (GUID) or "Universally Unique Identifier" (UUID) may refer to a 128-bit label used for information in computer systems. In some embodiments, a unique application identifier may be assigned to each application. In some embodiments, a best-effort protocol may be used to publish and route objects. In some embodiments, a described gossip protocol may utilize a Tapestry topology.

In some embodiments, the network may have a Pastry topology. In some embodiments, the network may utilize a Pastry topology. In some embodiments, a Pastry hash table's key-space may be circular, like the aforementioned Chord key-space. In some embodiments, node IDs may be 128-bit unsigned integers representing position in the circular key-space. In some embodiments, node IDs may be chosen randomly and uniformly. In some embodiments, the routing overlay network may be formed on top of the hash table by each peer discovering and exchanging state information consisting of a list of leaf nodes, a neighborhood list, and a routing table. In some embodiments, the leaf node list may include the L/2 closest peers by node ID in each direction around the circle. In some embodiments, the neighborhood list may include the M closest peers in terms of the routing metric. In some embodiments, the neighborhood list may not be used directly in the routing algorithm and is used for maintaining locality principles in the routing table. In some embodiments, the routing table includes one entry for each address block assigned to it. To form the address blocks, the 128-bit key may be divided up into digits with each digit being b bits long, yielding a numbering system with base $2^b$. This partitions the addresses into distinct levels from the viewpoint of the client, with level 0 representing a zero-digit common prefix between two addresses, level 1 a one-digit common prefix, and so on. The routing table may include the address of the closest known peer for each possible digit at each address level, except for the digit that belongs to the peer itself at that particular level. This may result in the storage of base $2^b-1$ contacts per level. In some embodiments, a described gossip protocol may utilize a Pastry topology.

Also provided herein is a method of selecting a preferred architecture of a network for hosting a dataset over a specified time period, in accordance with the principles of the described embodiments. The network may include a storage layer. The network may include a compression layer. The network may include an evaluator layer.

The storage layer may include a DHT. The DHT may include a plurality of nodes. One or more of the nodes may have a routing table. One or more of the nodes may include a routing table. One or more of the nodes may be associated with a routing table. One or more of the nodes may optionally include a supplementary read table. One or more of the nodes may optionally include a supplementary write table. Any node that does not have a supplementary read table and/or supplementary write table may subsequently receive one, for example as part of a shortening protocol described herein.

The DHT may have either a first proposed architecture or a second proposed architecture. The DHT may include either a first or second proposed architecture. The method may be a method of determining which proposed architecture is superior.

The method may include the step of inputting a specified time period that is desired to be evaluated. The method may be operable to input a specified time period that is desired to be evaluated. The time period may be received from a human operator. The time period may be supplied by a machine learning algorithm.

The method may include the step of inputting a maximal allowable overall storage volume of the DHT. The method may be operable to input a maximal allowable overall storage volume of the DHT. The maximal allowable volume may be received from a human operator. The maximal volume may be supplied by an evaluator layer. The maximal volume may be supplied by a machine learning algorithm.

The method may include the step of inputting an estimated frequency of data retrieval queries. The method may be operable to input an estimated frequency of data retrieval queries. The estimated frequency may be received from a human operator. The estimated frequency may be supplied by an evaluator layer. The evaluator layer is a layer described in more detail herein. The estimated frequency may be supplied by a machine learning algorithm. The estimated frequency may be obtained based on real-world experience with the database.

A herein-described method may include the step of inputting a maximal allowable number of node hops. The method may be operable to input a maximal node hop number. The maximal allowable number may be received from a human operator. The maximal allowable number may be supplied by an evaluator layer. The maximal allowable number may be supplied by a machine learning algorithm.

The method may include the step of simulating the ingestion of the dataset into the DHT under dynamic path length conditions, over the specified time period. The method may include the step of simulating ingestion of the dataset by the DHT under dynamic path length conditions. The method may be operable to simulate ingestion of the dataset into or by the DHT under dynamic path length conditions, over the specified period. Such conditions may be as described hereinbelow. The simulation may be performed by the evaluator layer of the network. Different scenarios may be employed, wherein the DHT has different architectures. In some embodiments, the first and second proposed architectures may be simulated.

For each proposed architecture, the method may include the step of simulating processing of the dataset by the DHT under the mentioned dynamic path length conditions, over the specified time period. The method may be operable to simulate processing of the dataset by the DHT under the dynamic path length conditions, over the specified time period. By simulating processing of the dataset, the network may determine an estimated throughput of the DHT for processing the dataset. The network may estimate or determine the time course of the throughput under dynamic path length conditions. The network may integrate the DHT throughput value over the specified time period. The integration of the estimated DHT throughput value may provide an overall throughput value. The integration of the estimated DHT throughput value may provide an average throughput value over the specified time period. These simulations and evaluations may be performed by the evaluator layer.

The method may include the step of comparing the different overall or average throughput values to one other, to determine which architecture provides superior throughput. The method may be operable to compare the different overall or average throughput values, to identify the superior architecture. These evaluations may be performed by the evaluator layer. The method may include the step of choosing the architecture (for example, selected from the below-described first and second architectures) having a higher overall throughput value. The method may be operable to choose the architecture having a higher overall throughput value. These evaluations may be performed by the evaluator layer.

In some embodiments, a machine learning (ML) engine is configured for optimizing the architecture of the DHT. The ML engine may be integral to the evaluator layer. The ML engine may be external to the evaluator layer. The ML engine may be integral to the compression layer. The ML engine may be external to the compression layer. The ML engine may utilize a supervised learning algorithm. The ML engine may utilize algorithm optimization.

The ML algorithm may be configured to supply an initial suggested architecture. The algorithm may be configured to evaluate the initial suggested architecture. The algorithm may be configured to iteratively vary the suggested architecture. The algorithm may be configured to evaluate variants of the architecture. The algorithm may be configured to determine whether a variant architecture is superior to the currently considered architecture. The algorithm may be configured to optimize variables of the DHT architecture.

The machine learning engine may be configured to record an execution parameter associated with DHT function. The machine learning engine may be configured to record an execution parameter associated with simulated DHT function. The engine may also record the DHT architecture utilized in each instance. The execution parameter may be the average latency for a data retrieval request. The execution parameter may involve the storage used by the DHT in the network.

The machine learning engine may be configured to output an optimized architecture. The architecture may be based at least in part on the execution parameter.

The described machine learning model may include multiclass (multinomial) classification. The multiclass classification may utilize a transformation-to-binary algorithm, an extension-from-binary algorithm, or a hierarchal classification algorithm. The transformation-to-binary algorithm may be a one-vs.-rest or one-vs.-one algorithm. The extension-from-binary algorithm may utilize a neural network, an extreme learning machines (ELM) network, a single hidden layer feed-forward neural network (SLFN), a k-nearest (kNN) algorithm, a Naive Bayes algorithm, a decision tree learning algorithm, a support vector machine algorithm, or a multi expression programming algorithm. The machine learning model may use logistic regression, for example when deciding between two possible architectures.

Also provided herein is a method of selecting a preferred architecture of a network for hosting a dataset, in accordance with the principles of the described embodiments. The method may utilize a machine learning algorithm. The method may calculate the preferred architecture over a specified time period. In some embodiments, the preferred architecture may utilize the fewest total resources over the specified time period or have the highest overall throughput over the time period. The disclosure does not intend to stipulate that the preferred architecture will be maintained only for the specified period.

The network may include a storage layer. The storage layer may include a DHT. The DHT may include a plurality of nodes. One or more of the nodes may have a routing table, One or more of the nodes may optionally have a supplementary read table. One or more of the nodes may optionally have a supplementary write table. Any node that initially does not have a supplementary read table and/or supplementary write table may subsequently receive one, for example as part of a shortening protocol described herein.

The network may include a compression layer. The network may include an evaluator layer.

The described method may include the step of inputting a specified time period. The method may be operable to input a specified time period. The time period may be received from a human operator. The time period may be supplied by an evaluator layer.

The described method may include the step of inputting a maximal allowable overall storage volume of the DHT. The method may be operable to input a maximal allowable overall storage volume of the DHT. The storage volume may be received from a human operator. The volume may be supplied by an evaluator layer.

The described method may include the step of inputting an estimated frequency of data retrieval queries. The method may be operable to input an estimated frequency of data retrieval queries. The frequency may be received from a human operator. The frequency may be supplied by an evaluator layer. The frequency may be an observed frequency. The frequency may be observed during initial use of the network or for some other suitable time of use.

The described method may include the step of inputting a maximal allowable number of node hops. The described method may be operable to input a maximal allowable number of node hops. The number may be received from a human operator. The number may be supplied by an evaluator layer.

The described method may include the step of obtaining a proposed architecture of the network. The described method may be operable to obtain a proposed architecture of the network. The architecture may be supplied by a human operator. The architecture may be supplied by an evaluator layer. The architecture may be supplied by a machine learning algorithm. The architecture may be referred to as the first proposed architecture.

The described method may include the step of simulating ingestion of the dataset in the DHT under dynamic path length conditions, wherein the DHT has the first proposed architecture. The described method may be operable to simulate ingestion of the dataset in the DHT under dynamic path length conditions, wherein the DHT has the first proposed architecture. The dynamic path length conditions may be as described herein.

The described method may include the step of determining an initial DHT throughput value and a time course of the DHT throughput value. The described method may be operable to determine an initial DHT throughput value and a time course of the DHT throughput value. The described method may include the step of integrating the DHT throughput value over the specified time period, thereby calculating the overall DHT throughput value. The described method may be operable to integrate the DHT throughput value over the specified time period, thereby calculating the overall DHT throughput value. These calculations may be performed by the described evaluator layer. For this (first) instance, the calculated DHT throughput value, time course, and overall DHT throughput value may be referred to as the first DHT throughput value, first time course, and first overall DHT throughput value, respectively. The simulation may be performed by the evaluator layer.

The described method may include the step of iteratively altering the proposed architecture. The method may be operable to iteratively alter the proposed architecture. The method may include the step of determining whether the alteration improves the simulated throughput of the network. The method may be operable to determine whether the alteration improves the simulated throughput of the network. These steps may be performed until a threshold throughput value has been achieved. These steps may be performed until measurable incremental improvements in the simulated throughput value are no longer achieved by the alterations. The alterations may be proposed by the evaluator layer.

As part of determining whether the alteration is beneficial, the evaluator layer may simulate ingestion of the dataset in the DHT under the described dynamic path length conditions, in this case with the DHT having the described altered proposed architecture. The evaluator layer may determine the initial DHT throughput value, the time course of the value, and integrate the throughput value over the specified time period, thereby calculating an overall throughput value. For this (subsequent) instance, the calculated throughput value, time course, and overall throughput value may be referred to as the second DHT throughput value, second time course, and second overall DHT throughput value, respectively. The simulation may be performed by the evaluator layer.

As part of determining whether the alteration is beneficial, the evaluator layer may compare the first overall throughput value to the second overall throughput value. When the second overall throughput value exceeds the first overall throughput value, the evaluator layer may replace the first proposed architecture by the altered proposed architecture.

When the second overall throughput value does not exceed the first overall throughput value, the first proposed architecture may remain unaltered.

It will be appreciated that, during subsequent suggested alterations in the architecture, the most recent architecture adopted by the machine learning algorithm may serve as the basis for comparison with the suggested further altered architecture. The most recently adopted architecture and the suggested further altered architecture may be referred to herein as the first and second proposed architectures, respectively.

Dynamic path length conditions.

The mentioned dynamic path length conditions of the described methods and compositions may refer to conditions wherein the network monitors actual overall storage volume of the DHT. The overall storage volume may refer to the total storage volume designated for the DHT, from all the nodes in network. The mentioned dynamic path length conditions may refer to conditions wherein the effective path length of retrieval requests may be modified or brought into conformity with maximal allowable number of node hops. The method for modifying the effective path length may be as described herein.

The method for modifying or conforming the effective path length may be performed iteratively. The method may be performed each time a request to retrieve an entry is received by the network. The method may include testing the data retrieval path length for conformity with a maximal allowable number.

To test the data retrieval path length for conformity with a maximal allowable number, the network may first receive a data retrieval query. The query may be received at a receiving node. The receiving node may be located in the described storage layer.

Next, the network may locate an authority node of the entry that is the subject of the query. The authority node may be located via a gossip protocol. The gossip protocol may interrogate in parallel, for each node participating in the gossip protocol, the supplementary read table, when extant, and the routing table. When the node does not have a supplementary read table, only the routing table may be interrogated. Reference to nodes participating in the gossip protocol may refer to both the initial (receiving) node and any intermediary nodes.

After the authority node is located, the network may determine how many node hops were required to locate the authority node. The number of nodes required may be referred to herein as the "observed node hop number".

When the observed node hop number exceeds the maximal allowable number of node hops, the network may perform a path shortening protocol. The protocol may be performed by the compression layer. The compression layer may also perform the determination of whether the observed node hop number exceeds the maximal allowable number of node hops.

The shortening protocol may include determining whether the receiving node has a supplementary read table. When the receiving node does not have a supplementary read table, the protocol may include creating a supplementary read table. Whether or not the supplementary read table was previously extent, the shortening protocol may include adding the entry's hash to the supplementary read table.

The shortening protocol may include determining whether the authority node has a supplementary write table. When the authority node does not have a supplementary write table, the protocol may include creating a supplementary write table. Whether or not the supplementary write table was previously extent, the shortening protocol may include adding the entry's hash to the supplementary write table.

In some embodiments, performance of the shortening protocol may be subject to the caveat that the shortening protocol is not performed when the actual overall storage volume exceeds the maximal allowable overall storage volume.

Architectures

In some embodiments, the herein-described architectures may be defined at least in part by a number of nodes. The node number may refer to the number of nodes in the network. In some embodiments, the described architectures may refer to the above-described first and second proposed architectures. The machine learning engine may be configured to propose different node numbers and simulate their respective effect on a chosen execution parameter of the DHT.

In some embodiments, the described architectures may be defined at least in part by a hashing algorithm. The term "hashing algorithm" may refer to the algorithm used to derive the hash of an entry from its key. In some embodiments, the term "architectures" may refer to possible configurations of a DHT. In some embodiments, the term "architectures" may refer to the above-described first and second proposed architectures. The machine learning engine may be configured to propose different hashing algorithms and simulate their respective effect on a chosen execution parameter of the DHT.

Additional Optional Method Steps

In some embodiments, a described method may include the step of receiving an update to the second entry. The method may be operable to receive an update to the second entry. In some embodiments, the method may include the step of propagating the update via the described second supplementary write table. The method may be operable to propagate the update via the described second supplementary write table.

In some embodiments, one or more of the described methods may include the step of estimating the time required to reach an equilibrium state. The method may be operable to estimate the time required to reach an equilibrium state The estimated time to reach equilibrium may be predicated on an estimated frequency on receiving data retrieval queries. An equilibrium state may be defined as a state in which the average number of node hops substantially equals the maximal allowable number of hops. The term "substantially equals" may refer to a difference of less than a 0.01 between the average number of hops and the maximal allowable number of hops. Alternatively, an equilibrium state may be defined as a state in which the average number of node hops does not appreciably change as additional data retrieval queries are received. A lack of appreciable change, in this regard, may refer to a change of less than 1% upon processing 10 retrieval queries. A lack of appreciable change may refer to a change of less than 1% upon processing 100 retrieval queries. A lack of appreciable change may refer to a change of less than 0.1% upon processing 10 retrieval queries. A lack of appreciable change may refer to a change of less than 0.1% upon processing 100 retrieval queries. In some embodiments, one or more of these steps may be performed by the evaluator layer. In some embodiments, all of these steps may be performed by the evaluator layer.

In some embodiments, a described method may include the step of inputting a maximal allowable equilibrating time. The method may be operable to input a maximal allowable equilibrating time. In some embodiments, when an estimated equilibrium time is calculated (for example, as described herein), the method may include the step of comparing the estimated equilibrating time to the maximal allowable equilibrating time. The method may be operable to compare the estimated equilibrating time to the maximal allowable equilibrating time. In some embodiments, the method may include the step of, when the estimated equilibrating time of a proposed architecture exceeds the maximal allowable equilibrating time, rejecting the proposed architecture. The method may be operable to rejected the proposed architecture.

A method in accordance with the principles of the described embodiments may utilize a computer processor and one or more non-transitory computer-readable media storing computer executable instructions. The instructions, when executed by the computer processor, may automatically store data in a DHT, retrieve data from the DHT, and/or update entries in the DHT.

The aforementioned processing device or computer processor may be a computer, as described in more detail in FIG. 1, optionally including any of the components and elements described for FIG. 1.

Figure 2:
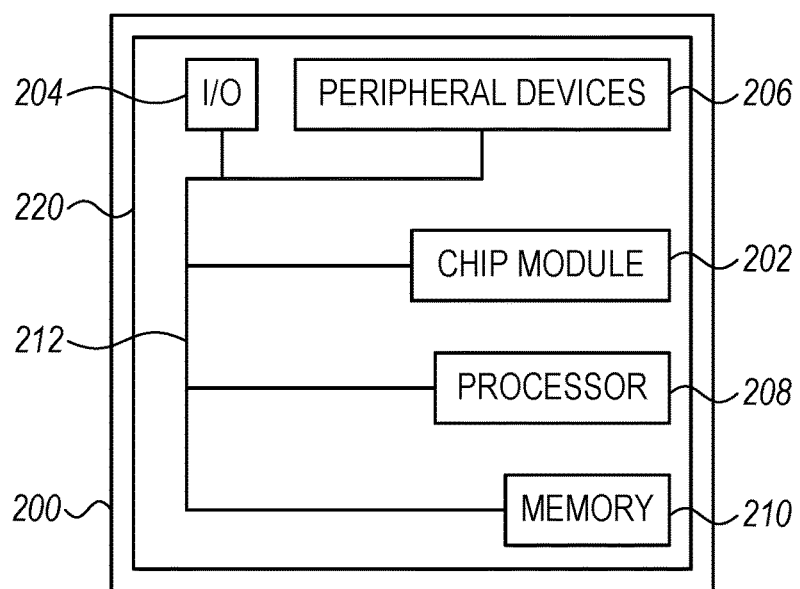
FIG. 2 shows an illustrative system in accordance with the principles of the described embodiments.

In some aspects, the processing device or computer processor may be a computer, as described in more detail in FIG. 2, optionally including any of the components and elements described for FIG. 2.

Apparatus and methods described herein are illustrative. Apparatuses and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. In some embodiments, an illustrative method may include steps shown in connection with another illustrative method.

Apparatuses may omit features shown or described in connection with illustrative apparatuses. Embodiments may include features that are neither shown nor described in connection with the illustrative apparatus. Features of illustrative apparatus may be combined. In some embodiments, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

The described network may comprise one or more computer systems and servers that include one or more of the following hardware components: Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative, and other means of establishing a communications link between computers may be used. The existence of various well-known protocols such as TCP/IP, Ethernet, FTP, HTTP, and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions, such as storage, retrieval, and automatic updates to value-key pairs in the DHT.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. Such programs may be considered engines for the purposes of this application and with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

FIG. 2 shows illustrative apparatus 200 that may be configured in accordance with the principles of the described embodiments. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
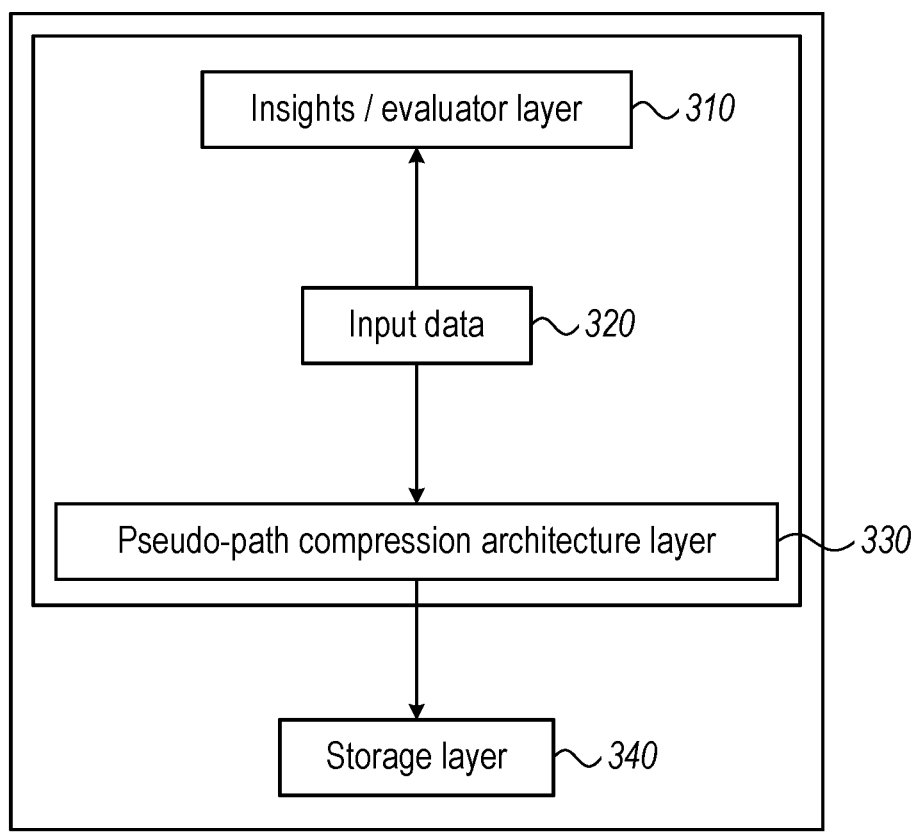
FIG. 3 depicts an architecture of an exemplary system.

FIG. 3 depicts a high-level architecture of an exemplary system and method of pseudo-path compression-based optimization for a decentralized data system. The data storage layer may employ distributed hash table-based storage. A baseline degree of replication may be predetermined. Data consistency may be handled by a gossip protocol.

With further reference to FIG. 3, insights/evaluator layer 310 may crawl and analyze the nature of input data 320 from a data source. Insights/evaluator layer 310 may simulate ingestion of input data 320 in storage layer 340 to generate insights. Insights/evaluator layer 310 may determine the expected steady state storage volume and expected steady state convergence time after processing by pseudo-path compression layer 330 (described hereinbelow). Insights/evaluator layer 310 layer may recommend an optimal infrastructure for handling the data.

With further reference to FIG. 3, pseudo-path compression layer 330 may implement a configurable path compression degree to cap the maximum number of node hops for any data retrieval. There may be a trade-off between the steady state storage volume and path compression degree parameters. Pseudo-path compression layer 330 may dynamically replicate data on which path compression is applied. Pseudo-path compression layer 330 may implement an extended gossip protocol to enable eventual consistency of path-compressed data.

Figure 4:
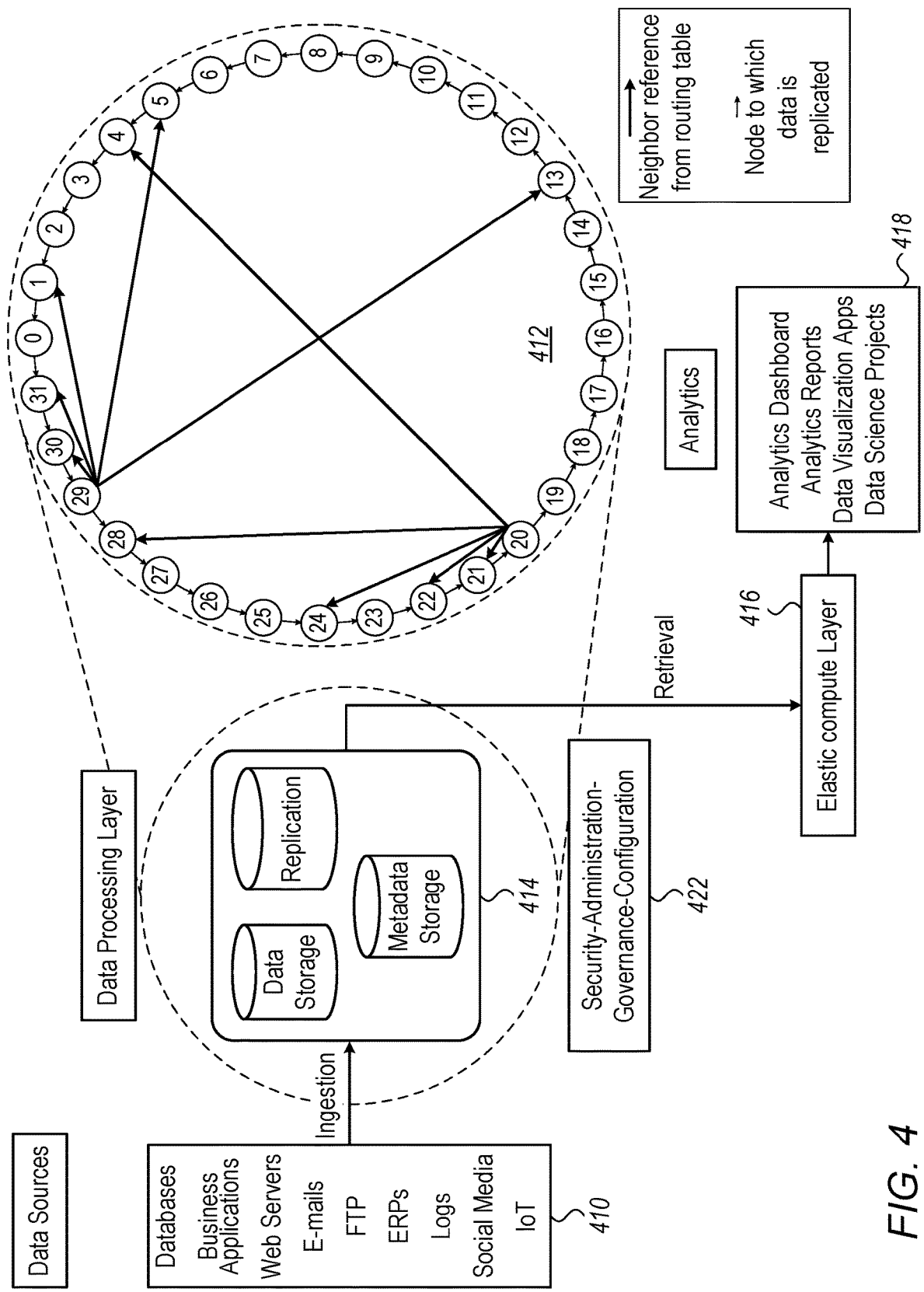
FIG. 4 depicts the architecture of an exemplary decentralized system.

FIG. 4 depicts the architecture of an exemplary decentralized system. A body of data or data source 410, which may be a data lake or in another format, may be desired to be stored in a DHT 412. Exemplary data sources are depicted on the left side. The data may be processed in a data processing layer 414 equipped for data storage and replication and metadata storage. There may be an elastic computing layer 416. Elastic computing layer 416 may manage requests from external systems, control access and verify that requests are appropriately authorized. Elastic computing layer 416 may be configured to respond dynamically to an estimated analytical workload. Elastic computing layer 416 may be configured to adjust infrastructure and/or resource levels according to the current workload.

With further reference to FIG. 4, there may be an analytics layer 418. This layer may be configured to generate or display an analytics dashboard, analytics reports, data visualization applications, and/or data science projects. The analytics may include system performance, node hop metrics, and/or latency metrics of the network. The system may include DHT 412, which may utilize a default routing algorithm (see FIG. 5). Data processing layer may optionally interact with security-administration-governance configuration layer 422.

FIG. 5 depicts an exemplary call retrieval flow path with a described pseudo-path compression system. The flow path illustrates Pseudo Path Compression of a Chord algorithm, solely for exemplification. The described methods may also be applicable to other DHT routing algorithms, such as CAN, Tapestry and Pastry. Nodes 530 of a Chord algorithm occupy a circular identifier space, wherein the node with the highest identifying number is considered the immediate predecessor of node 1. The Chord default routing algorithm of node #20 532 is depicted by arrows. When a data retrieval query is received, for example by node #20 532, node #20 532 consults its routing table, which lists initial routing nodes 534 #21, #22, #24, #28, and #4, which are 1, 2, 4, 8, and 16 nodes away from node 20 in the ascending direction, as depicted by arrows 536.

FIG. 5 illustrates a data query for entry SHA256 (ACC_NUM_18)=7825815 . . . 2211, in the scenario of a 32-node DHT cluster ring, under dynamic path length conditions with a path compression degree=0.5. Hence, the maximum allowable number of node hops=2 (the inverse of the path compression degree, i.e., [1/0.5]). The hash value for ACC_NUM_18 is 2211, based on the last 4 digits of SHA256's Hash. The DHT Address of the entry is 3 (modulo 32 of the hash value). The data 520 in node #3 538 was replicated to node #2 540 as part of the baseline replication of the DHT, such that nodes #2 540 and #3 538 are authorities of the data. (Solely for purposes of exemplification, the replication factor of the DHT is taken as 2, and baseline replication is presumed to occur to the previous node, as shown by arrows 540).

With further reference to FIG. 5, a request for retrieval of this entry is received by node #20 532. Node #20 532 calculates the hash value (2211) of the data (ACC_NUM_18) and determines that this entry is not present in its distributed hash table (DHT) shard. Then node #20 532 compares the DHT address (3) of the data with its routing table. Node #20 determines that node #28 542 is the closest neighbor to node #3 538 or #2 540. Node #28 542 then performs a lookup of the hash value (2211). Since node #28 542 is not the authority of the data, node #28 542 consults node #28's routing table and determines that node 0 is the closest neighbor to node 3 or 2. Node 0 then performs a lookup of the hash value (2211). Since node #2 540 is a neighbor to node #0 544 and is an authority for the data, node #2 540 then retrieves and returns the entry.

With further reference to FIG. 5, the aforementioned retrieval required 3 node hops 544, 546, and 548, which is greater than the defined limit of 2. A path compression write table may be created for node #2 540. A path compression read table may be created for node #20 532. The hash value entry that was the subject of the query may be added to its path compression write table of node #2 540 and the path compression read table of #20 532 (tables are depicted in FIG. 6).

With further reference to FIG. 5, the path compression write table may be incorporated into an extended gossip protocol to process updates to ACC_NUM_18 (2211) and enable eventual consistency. For future queries, the distributed hash table and the path compression read table of each node may be consulted or queried in parallel to search for the data query subject.

FIG. 6A depicts a DHT and routing table snapshot of the scenario described for FIG. 5, prior to pseudo path compression. Depicted are DHT 630 and routing 632 tables for node #20 and DHT 634 and routing 636 tables for node #2. Also depicted are routing table 638 for node #28 and routing table 640 for node #0. For DHT's the hash, DHT address, and data of selected entries are displayed, in the 3 columns from left to right. For routing tables, the DHT address, node detail/IP address, and node distance are displayed, in the 3 columns from left to right.

FIG. 6B depicts a DHT and routing table snapshot of the scenario described for FIG. 5, following pseudo path compression. DHT table 650, routing table 652, path compression read table 654 and path compression write table 656 are shown for node 20. DHT table 660, routing table 662, path compression read table 664 and path compression write table 666 are shown for node 2. Path compression write table 656 for node 20 is blank, since node 20 has not yet served as an authority node in a pseudo path compression protocol. Path compression read table 664 for node 2 is blank, since node 2 has not yet served as a receiving node in a pseudo path compression protocol.

Figure 6C:
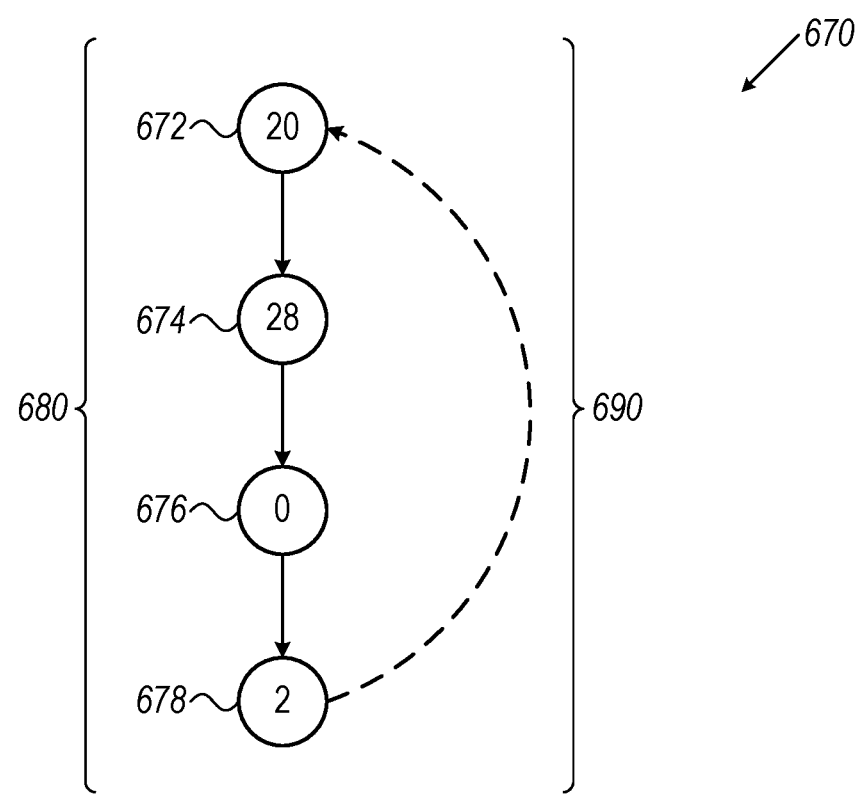
FIG. 6C portrays a schematic view of a pseudo path compression protocol.

FIG. 6C portrays a schematic view of the pseudo path compression route 670 achieved for the scenario described for FIG. 5. Default route 680 traverses nodes #20 672, #28 674, #0 676, and #2 678. Compressed route 690 directly connects nodes #20 672 and #2 678.

Figure 7A:
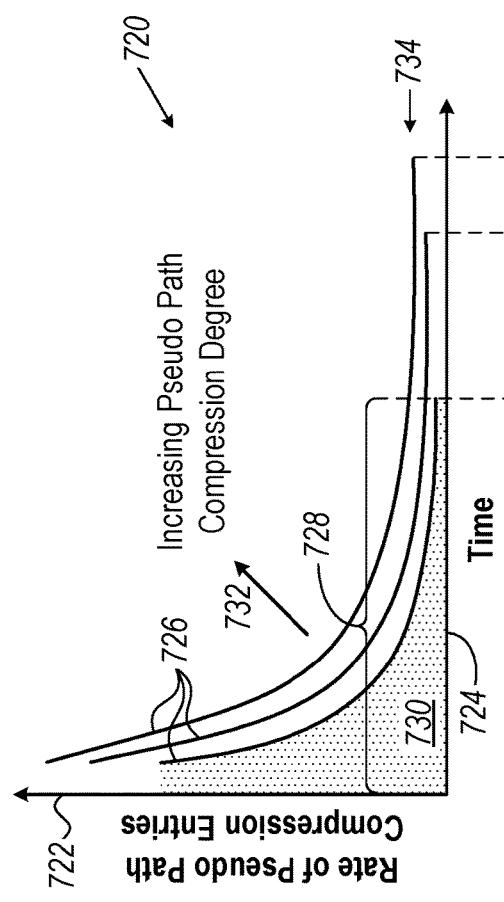
FIG. 7A, top panel, is a plot of a possible relationship between the rate of pseudo-path compression events and time.
Figure 7A:
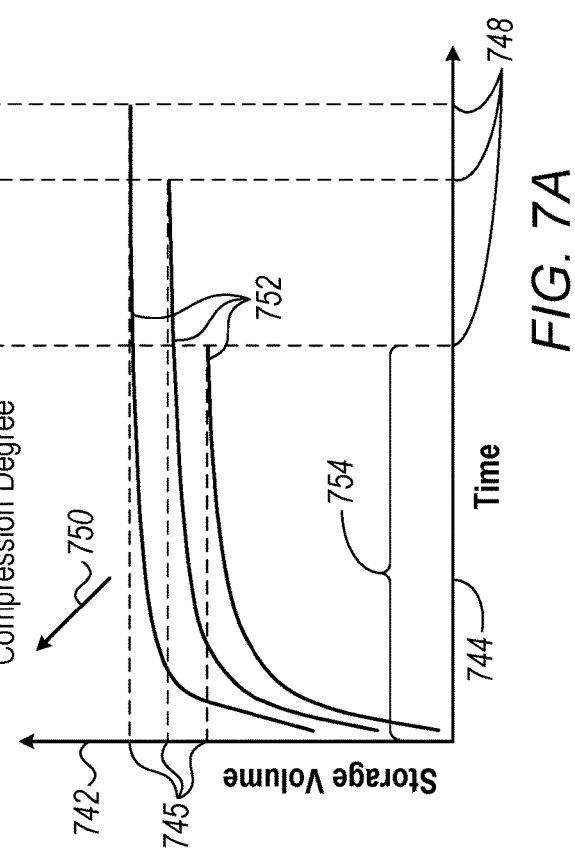

FIG. 7A, depicts a plot 720 of a possible relationship between the rate of pseudo-path compression events (vertical axis 722) and time (horizontal axis 724). As illustrated, the rate of Pseudo Path Compression events may exponentially decrease as time passes and the cluster approaches steady state, as shown by curves 726. This time period 728 (shown for lower curve only) may be referred to as the "steady-state convergence time".

With further reference to FIG. 7A, top panel, for a given Pseudo path compression degree, the area 730 under the curve (labeled for lowest curve only) equals the total number of pseudo path compression entries. As pseudo path compression degree increases (direction of arrow 732), curves 726 may move further away from the origin 734, indicating a higher rate of compression entries and greater steady state convergence time i.e., a longer time period for the storage mechanism to reach steady state. A greater rate of pseudo path compression entries may increase the processing power required by the nodes in the cluster.

FIG. 7A also depicts a plot 740 of a possible relationship between the storage volume (vertical axis 742) and time (horizontal axis 744). For a given pseudo path compression degree, storage volume 742 may asymptotically converge to the Steady State Storage Volume 745 at a point in time called "steady-state convergence time". As pseudo path compression degree increases (direction of arrow 750), curves 752 may shift higher, indicating a larger requirement for storage volume 742 and larger steady state storage volume 745, as well as a greater steady state convergence time 754 (labeled for lowest curve only). Curves 752 show that there may be a trade-off between the amount of storage space required and the pseudo path compression degree.

Figure 7B:
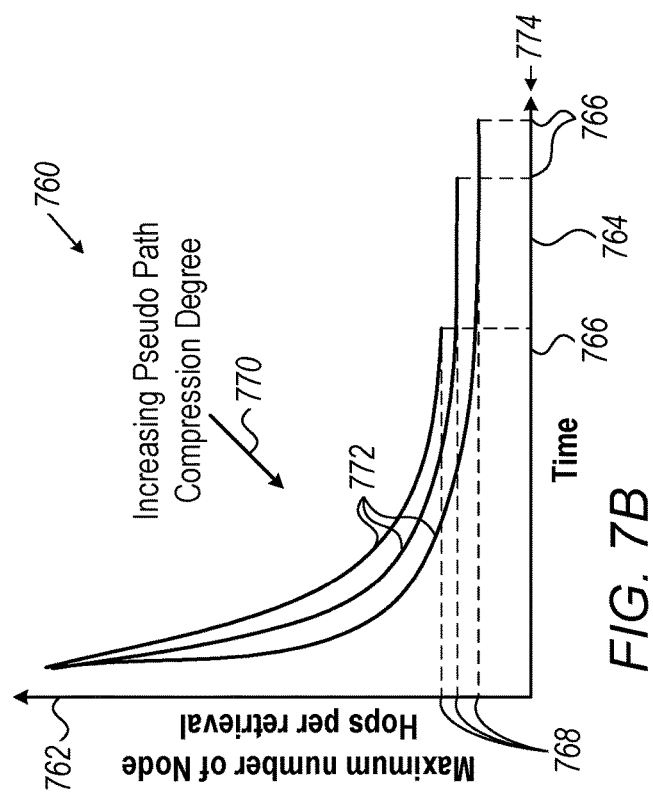
FIG. 7B is a plot of a possible relationship between the average of worst-case number of node hops per retrieval and time.

FIG. 7B shows a plot 760 of a possible relationship between the average of worst-case number of node hops per retrieval (vertical axis 762) and time (horizontal axis 764), for a given pseudo-path compression degree. The worst-case number of node hops 762 per retrieval may start off at roughly the same value irrespective of the pseudo-path compression degree. The worst-case number of node hops 762 per retrieval may decrease as time 764 passes and the cluster approaches steady state at the steady-state convergence time 766. After reaching steady state, the maximum number of node hops 762 per retrieval may equal the inverse 768 of the pseudo path compression degree. As the pseudo path compression degree increases (direction of arrow 770), curves 772 may approach the origin 774, indicating smaller worst case latency and greater steady-state convergence time.

As will be appreciated by one of ordinary skill in the art, the present invention may be embodied as an apparatus (including, for example, a system, a machine, a device, a computer program product, and/or the like), as a method (including, for example, a process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented, the computer device and application-specific circuits associated therewith are deemed specialized computer devices capable of improving technology associated with intelligently controlling data transfers between network connected devices and a platform layer application server.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. In some embodiments, in some embodiments, the non-transitory computer-readable medium includes a tangible medium such as a portable computer diskette, a hard disk, a random-access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for intelligently controlling data transfers between network connected devices and a platform layer application server, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

In some aspects of the described methods and systems, a regulated machine learning (ML) model is utilized. The regulated ML model is designed to make incremental learning adjustments in tandem with the determinations made by the machine learning engine and communicated to the regulated ML model. The ML engine accesses data output from data retrieval query analytics, and the ML engine is trained to use data from the data queries to collectively formulate and approve incremental learning adjustments with the regulated ML model. The regulated ML model and ML engine may consider input data patterns, output data patterns, thresholds for model performance, and/or distributions of identified patterns between different ML models.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods, systems, apparatuses, and computer program products for enhancement of decentralized data systems are provided. Persons skilled in the art will appreciate that the present invention can be practiced by other than the described embodiments, which are presented for purposes of illustration rather than of limitation.

What is claimed is:

1. A computer network, the computer network comprising:
   a storage layer, the storage layer comprising a distributed hash table (DHT), the DHT comprising:
      a plurality of nodes; each node, included in the plurality of nodes, comprising a routing table; and
      a dataset;
   a compression layer, the compression layer being configured to:
      input a maximal allowable number of node hops; and
      when a first data retrieval query for a first entry is received by a first receiving node, and the first entry is provided by a providing node:
         determine how many node hops occurred, hereinafter referred to as the "observed node hop number";
         compare the observed node hop number to the maximal allowable number; and
         when the observed node hop number exceeds the maximal allowable number, perform a shortening protocol, the protocol operable to:
            create a supplementary read table of the first receiving node, the supplementary read table comprising the first entry's hash; and
            create a supplementary write table of the providing node, the supplementary write table comprising the first entry's hash; and
   an evaluator layer, the evaluator layer being configured to:
      simulate ingestion of the dataset by the DHT; and
      estimate frequency of performing the shortening protocol;
   wherein, when a second data retrieval query is received for a second entry by a second receiving node, the second receiving node is configured to interrogate in parallel the second receiving node's routing table and the second receiving node's supplementary read table.

2. The system of claim 1, wherein the evaluator layer is further configured to:
   estimate an initial average number of node hops for a plurality of data retrieval queries, wherein the shortening protocol has not been performed for any entries in the dataset; and
   determine an estimated time course for each of:
      the frequency of performing the shortening protocol; and
      an average number of node hops.

3. The system of claim 2, wherein the evaluator layer is further configured to estimate a time required to reach an equilibrium state, wherein the average number of node hops substantially equals the maximal allowable number.

4. The system of claim 1, wherein the supplementary write table is configured to propagate updates to the first entry.

5. A method of improving throughput of a network, the network comprising a distributed hash table (DHT), the DHT comprising a plurality of nodes, each node comprising a routing table,
   the method comprising:
      inputting a maximal allowable number of node hops;
      receiving, via a first receiving node, a first data retrieval query for a first entry;
      locating a first authority node via a first gossip protocol, wherein the first gossip protocol interrogates the routing tables of the first receiving node and an intermediate node participating in the gossip protocol;

determining how many node hops were required to locate the first authority node, hereinafter referred to as the "first observed node hop number";

when the first observed node hop number exceeds the maximal allowable number, perform a first shortening protocol, the protocol operable to:
create a first supplementary read table for the first receiving node;
add the first entry's hash to the first supplementary read table;
create a first supplementary write table for the first authority node; and
add the first entry's hash to the first supplementary write table; and iteratively:
receiving, via a second receiving node, a second data retrieval query for a second entry;
locating a second authority node via a second gossip protocol, wherein the second gossip protocol interrogates in parallel, for each node participating in the second gossip protocol:
the routing table; and
the supplementary read table, when extant;
determining how many node hops were required to locate the second authority node, hereinafter referred to as the "second observed node hop number"; and
when the second observed node hop number exceeds the maximal allowable number, perform a second shortening protocol, the protocol operable to:
when the second receiving node does not have a second supplementary read table, create a second supplementary read table and adding the second entry's hash to the second supplementary read table;
when the second receiving node has a second supplementary read table, add the second entry's hash to the second supplementary read table;
when the second authority node does not have a supplementary write table, create a second supplementary write table and adding the second entry's hash to the second supplementary write table; and
when the second authority node has a supplementary write table, add the second entry's hash to the second supplementary write table.

6. The method of claim 5, wherein the gossip protocol has a topology selected from the group consisting of Chord, CAN, Tapestry, and Pastry.

7. The method of claim 5, further comprising:
receiving an update to the second entry; and
propagating the update via the second supplementary write table.

8. The method of claim 5, further comprising:
inputting a maximal allowable amount of storage volume for the second receiving node;
monitoring actual storage volume occupied by the DHT in the second receiving node; and
when the actual storage volume exceeds the maximal allowable amount of storage volume, instructing the second receiving node to disallow further additions to the second supplementary read table.

9. A method of selecting a preferred architecture of a network for hosting a dataset over a specified time period, wherein:

the network comprises a storage layer, a compression layer, and an evaluator layer;
the storage layer comprises a distributed hash table (DHT), the DHT comprising a plurality of nodes;
each node comprises a routing table, optionally a supplementary read table, and optionally a supplementary write table; and
the DHT may have either a first proposed architecture or a second proposed architecture,
the method comprising:
inputting the specified time period;
inputting a maximal allowable overall storage volume of the DHT;
inputting an estimated frequency of data retrieval queries;
inputting a maximal allowable number of node hops;
simulating ingestion of the dataset under dynamic path length conditions, wherein the DHT has the first proposed architecture, determining a first time course of a first DHT throughput value, and integrating the first DHT throughput value over the specified time period, thereby calculating a first overall throughput value;
simulating ingestion of the dataset under the dynamic path length conditions, wherein the DHT has the second proposed architecture, determining a second time course of a second DHT throughput value, and integrating the second DHT throughput value over the specified time period, thereby calculating a second overall throughput value;
the evaluator layer comparing the first overall throughput value to the second overall throughput value; and
the evaluator layer choosing the architecture having a higher overall throughput value;
wherein the dynamic path length conditions comprise monitoring actual overall storage volume of the DHT; and, for each request to retrieve an entry:
receiving, via a receiving node in the storage layer, the data retrieval query;
locating an authority node of the entry via a gossip protocol, wherein the gossip protocol interrogates in parallel, for each node participating in the gossip protocol:
the routing table; and
the supplementary read table, when extant;
determining how many node hops were required to locate the authority node, hereinafter referred to as the "observed node hop number"; and
when the observed node hop number exceeds the maximal allowable number of node hops, performing a shortening protocol, the protocol operable to:
when the receiving node does not have a supplementary read table, create a supplementary read table and adding the entry's hash to the supplementary read table;
when the receiving node has a supplementary read table, add the entry's hash to the supplementary read table;
when the authority node does not have a supplementary write table, create a supplementary write table and adding the entry's hash to the supplementary write table;
and
when the authority node has a supplementary write table, add the entry's hash to the supplementary write table, provided that the shortening protocol is not performed when the actual overall storage volume exceeds the maximal allowable overall storage volume.

10. The method of claim 9, wherein the architecture is defined at least in part by a node number.

11. The method of claim 9, wherein the architecture is defined at least in part by a hashing algorithm.

12. The method of claim 9, the method further comprising: receiving an update to the entry; and propagating the update via the supplementary write table.

13. The method of claim 9, the method further comprising the evaluator layer determining an estimated equilibrating time, wherein, upon concluding the equilibrating time, the average of the observed node hop number substantially equals the maximal allowable number of node hops.

14. The method of claim 13, the method further comprising:
   inputting a maximal allowable equilibrating time;
   comparing the estimated equilibrating time to the maximal allowable equilibrating time;
   when the estimated equilibrating time of a proposed architecture exceeds the maximal allowable equilibrating time, rejecting the proposed architecture.

15. A method of selecting, via a machine learning algorithm, a preferred architecture of a network for hosting a dataset over a specified time period, wherein:
   the network comprises a storage layer, a compression layer, and an evaluator layer;
   the storage layer comprises a distributed hash table (DHT), the DHT comprising a plurality of nodes;
   each node comprises a routing table, optionally a supplementary read table, and optionally a supplementary write table; and
   the method comprising:
      inputting a specified time period;
      inputting a maximal allowable overall storage volume of the DHT;
      inputting an estimated frequency of data retrieval queries;
      inputting a maximal allowable number of node hops;
      obtaining a first proposed architecture;
      the evaluator layer simulating ingestion of the dataset in the DHT under dynamic path length conditions, wherein the DHT has the first proposed architecture, determining a first time course of a first DHT throughput value, and integrating the first DHT throughput value over the specified time period, thereby calculating a first overall DHT throughput value; and
      iteratively:
         altering the first proposed architecture to obtain an altered proposed architecture;
         the evaluator layer simulating ingestion of the dataset in the DHT under the dynamic path length conditions, wherein the DHT has the altered proposed architecture, determining a second time course of a second DHT throughput value, and integrating the second DHT throughput value over the specified time period, thereby calculating a second overall DHT throughput value;
         the evaluator layer comparing the first overall throughput value to the second overall throughput value; and
         when the second overall throughput value exceeds the first overall throughput value, replacing the first proposed architecture by the altered proposed architecture;
      wherein the dynamic path length conditions comprise the network monitoring actual storage volume of the DHT; and, for each request to retrieve an entry:
         receiving, via a receiving node in the storage layer, the data retrieval query;
         locating an authority node of the entry via a gossip protocol, wherein the gossip protocol interrogates in parallel, for each node participating in the gossip protocol:
            the routing table; and
            the supplementary read table, when extant;
         determining how many node hops were required to locate the authority node, hereinafter referred to as the "observed node hop number"; and
         when the observed node hop number exceeds the maximal allowable number, performing a shortening protocol, the protocol operable to:
            when the receiving node does not have a supplementary read table, create a supplementary read table and adding the entry's hash to the supplementary read table;
            when the receiving node has a supplementary read table, add the entry's hash to the supplementary read table;
            when the authority node does not have a supplementary write table, create a supplementary write table and adding the entry's hash to the supplementary write table;
            and
            when the authority node has a supplementary write table, add the entry's hash to the supplementary write table,
         provided that the shortening protocol is not performed when the actual storage volume exceeds the maximal allowable overall storage volume.

16. The method of claim 15, wherein the architecture is defined at least in part by a node number.

17. The method of claim 15, wherein the architecture is defined at least in part by a hashing algorithm.

18. The method of claim 15, the method further comprising: receiving an update to the entry; and propagating the update via the supplementary write table.

19. The method of claim 15, the method further comprising the evaluator layer determining an estimated equilibrating time, wherein, upon concluding the equilibrating time, the average of the observed node hop number substantially equals the maximal allowable number of node hops.

20. The method of claim 19, the method further comprising:
   inputting a maximal allowable equilibrating time;
   comparing the estimated equilibrating time to the maximal allowable equilibrating time;
   when the estimated equilibrating time of a proposed architecture exceeds the maximal allowable equilibrating time, rejecting the proposed architecture.

* * * * *